United States Patent

[19]

Kato

[11] Patent Number: 5,936,781

[45] Date of Patent: Aug. 10, 1999

[54] ZOOM LENS

[75] Inventor: Takashi Kato, Sakai, Japan

[73] Assignee: Minolta Co., Ltd., Osaka, Japan

[21] Appl. No.: 09/050,904

[22] Filed: Mar. 31, 1998

[30] Foreign Application Priority Data

Mar. 31, 1997 [JP] Japan ................................ 9-079770

[51] Int. Cl.⁶ .................................................. G02B 15/14
[52] U.S. Cl. ........................................ 359/699; 359/700
[58] Field of Search .................................. 359/694, 699, 359/700, 701

[56] References Cited

U.S. PATENT DOCUMENTS

| | | |
|---|---|---|
| 4,534,625 | 8/1985 | Ohnuki . |
| 5,144,490 | 9/1992 | Yamanouchi ......................... 359/694 |
| 5,337,187 | 8/1994 | Fukino et al. ....................... 359/699 |
| 5,546,234 | 8/1996 | Yamanouchi ......................... 359/700 |
| 5,576,893 | 11/1996 | Yamanouchi ......................... 359/701 |
| 5,663,839 | 9/1997 | Kanno .................................. 359/700 |

FOREIGN PATENT DOCUMENTS 57-004018  1/1982  Japan .
63-049715  3/1988  Japan .

*Primary Examiner*—Loha Ben
*Attorney, Agent, or Firm*—Burns, Doane, Swecker & Mathis, L.L.P.

[57] ABSTRACT

A zoom lens structure having a smaller number of assembling parts, so that the structure is more compact, and is manufactured at lower cost. A cam ring has a focusing cam slot for determing a displacement amount of a focusing lens group along an optical axis at time of focusing, and a zooming cam slot for determining a displacement amount thereof in cooperation with the focusing cam slot at time of zooming. At time of focusing, the cam ring is moved along the optical axis without rotation. The cam ring also has another slot, being formed in parallel with a direction in which the cam ring moves at time of focusing, for guiding a zooming lens group. In case that the cam ring is driven at time of focusing, the driving force is not transmitted to the zooming lens group. Therefore, it is possible to drive the focusing lens group only along the optical axis at time of focusing.

10 Claims, 4 Drawing Sheets

Fig. 2 PRIOR ART
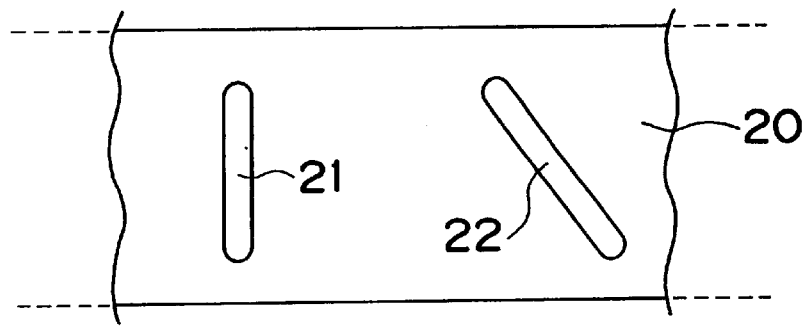
Fig. 3 PRIOR ART
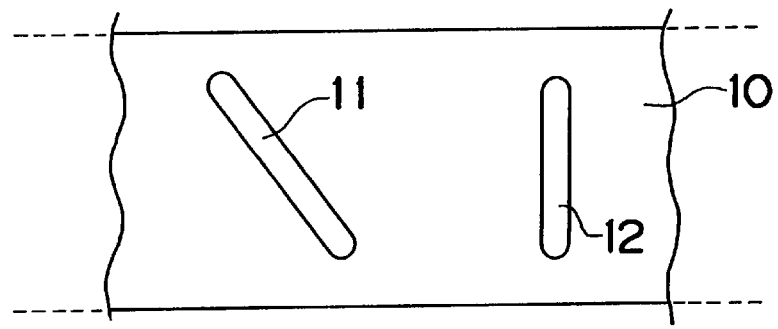
Fig. 4 PRIOR ART
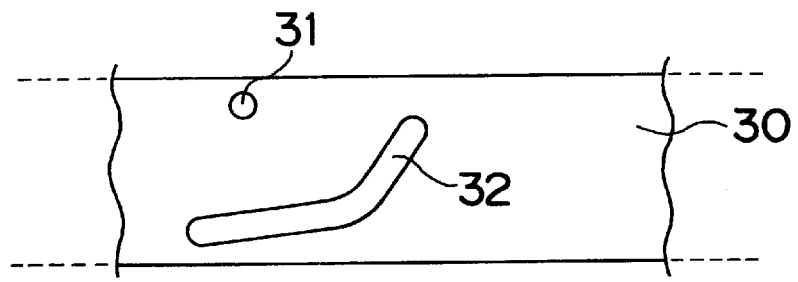
Fig. 5 PRIOR ART
Fig. 6 PRIOR ART
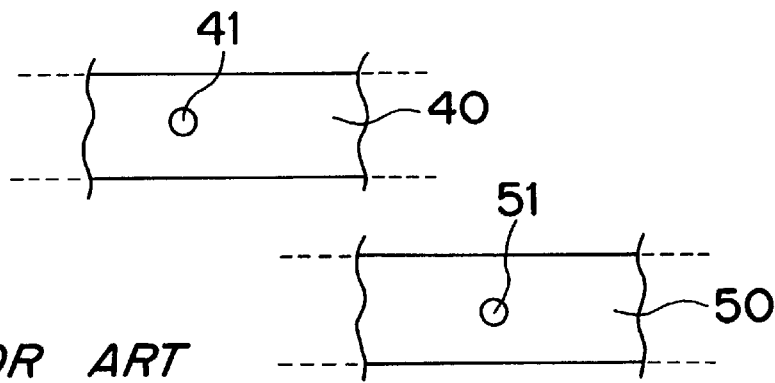

ZOOM LENS

This application is based upon an application No. 09-079770 filed in Japan, the contents of which are hereby incorporated by reference.

BACKGROUND OF THE INVENTION

1. Field of the Invention

The present invention generally relates to a zoom lens used in an optical device, such as a still camera or a video camera, and particularly relates to the zoom lens which is of an inner focusing type or of a rear focusing type, in which a feeding amount of a focusing lens group is changed according to a zooming region where a focusing operation is performed.

2. Description of the Related Arts

A zoom lens is capable of changing a magnification of an arbitrary object, while the object is in focus. That is, when a zooming operation is performed, a plurality of lens groups which the zoom lens comprises move relatively to one another along an optical axis of the zoom lens, and a particular lens group of the lens groups performs a focusing operation as well as the zooming operation.

Hereinafter, such a lens group having the function to perform the focusing operation is referred to as a "focusing lens group," and the lens group except the "focusing lens group" is referred to as a "zooming lens group."

That is, when a distance to the arbitrary object is changed with a magnification unchanged, the zooming lens group do not move, and only the focusing lens group moves along the optical axis thereof, thus performing the focusing operation.

When the object moves from a closest position to an infinite position relative to the zoom lens with a magnification being fixed, the amount in movement required for the focusing lens group which is of a front focus type is constant irrespective of the magnification. Meanwhile, the amount in movement required for the focusing lens group which is of an inner focusing type or of a rear focusing type is not constant when the magnification is changed, i.e., when the zooming region is changed.

Accordingly, as to the zoom lens in which the zoom lens operation barrel is rotated, or is moved back and forth, manually or automatically, at time of zooming or a zooming operation, a focusing cam is adopted to change a feeding amount of the focusing lens group according to a desired zooming region with respect to a constant rotation amount of the zoom lens operation barrel or to a constant movement amount thereof along the optical axis.

FIG. 1 is a general sectional view showing an example of a zoom lens which comprises four lens groups; namely, a first lens group 1, a second lens group 2, a third lens group 3, and a fourth lens group 4. The construction of the zoom lens is generally similar to that disclosed in U.S. Patent Publication No. 5144490.

In the example, the second lens group 2 is used as the focusing lens group, whereas the first lens group 1, the third lens group 3, and the fourth lens groups 4 are, respectively, used as the zooming lens group. Paying attention to the second lens group 2, as the focusing lens group, and the third lens group 3, as the zooming lens group 3, how they work and function is described below.

FIGS. 2 through 6 are partly developed explanatory views of a zoom ring 20, a fixed cylinder 10, a focusing ring 30, an annular lens frame 40 of the second lens group 2, and an annular lens frame 50 of the third lens group 3.

In the zoom lens, the fixed cylinder 10 which is stationary relative to the camera body to which the zoom lens is connected, inserts and fits in the inner periphery of the zoom ring 20, and the focusing ring 30 inserts and fits in the inner periphery of the fixed cylinder 10. When a zoom lens operation barrel 5 which is positioned outermost is rotated at time of the zooming operation, the zoom ring 20 rotates in unison with the rotation of the zoom lens operation barrel. The focusing ring guide pin 31 which is fixed to the focusing ring 30 is inserted into both zoom cam slot 11 of the fixed cylinder 10 and guide slot 21 of the zoom ring 20. The guide slot 21 functions to linearly guide the focusing ring 30. Thus, upon rotation of the zoom ring 20, the focusing ring 30 moves back and forth, with the focusing ring 30 rotating.

On the other hand, the annular lens frame 40 of the second lens group 2 inserts and fits in the inner periphery of the focusing ring 30. A second lens group guide pin 41 which is fixed to the annular lens frame 40 is inserted into a focusing cam slot 32 of the focusing ring 30. Accordingly, the second lens group 2 moves back and forth by an amount corresponding to the amount in movement of the focusing ring 30 in the direction of the optical axis.

Provided that the amount in movement of the second lens group 2 is $Z_1$, the amount $Z_1$ in the movement is determined by a component in the direction of the optical axis of the zoom cam slot 11 formed on the fixed cylinder 10.

The second lens group guide pin 41 penetrates through an escaping hole formed on each of the fixed cylinder 10 and the zoom ring 20, and the second lens group guide pin 41 projects outside from the zoom ring 20 and engages a fork-shaped restriction member 60. The restriction member 60 is rotated relative to the fixed cylinder 10 only at time of the focusing operation, and the restriction member 60 remains stationary at time of the zooming operation. In FIG. 1, a reference numeral 61 denotes a motor unit for driving the restriction member 60.

In the construction, when the focusing ring 30 rotates at time of zooming, the second lens group guide pin 41 which engages the restriction member 60, moves along the focusing cam slot 32 of the focusing ring 30. As a result, the second lens group 2 moves back and forth relative to the focusing ring 30 by an amount which corresponds to a component in the direction of the optical axis of the focusing cam slot 32 of the focusing ring 30. The amount in movement of the second lens group 2 is $Z_2$.

As described above, when the zoom ring 20 rotates, the focusing ring 30 moves back and forth by the amount $Z_1$ in movement relative to the fixed cylinder 10, and the annular lens frame 40 moves back and forth by the amount $Z_2$ in movement relative to the focusing ring 30. Consequently, the second lens group 2 moves by a total amount of $(Z_1+Z_2)$ relative to the fixed cylinder 10.

By the way, as indicated by the curving shape of the focusing cam slot 32 in FIG. 4, the amount $Z_2$ in movement of the second lens group 2 relative to a constant amount in movement of the restriction member 60, is not constant according to its zooming region.

Meanwhile, the third lens group guide pin 51 which is fixed to the annular lens frame 50 of the third lens group 3 is inserted into both zoom cam slot 22 of the zoom ring 20 and guide slot 12 of the fixed cylinder 10. Thus, when the zoom ring 20 rotates, relative to the fixed cylinder 10 the third lens group does not rotate and moves back and forth.

Next, a description is made below on a case in which a distance to an object changes with a magnification (zooming region) not changed and constant.

The restriction member 60 is rotated relative to the fixed cylinder 10, in unison with an operation of a manual or automatic focusing (AF) mechanism. At this time, the focusing ring 30 is stationary relative to the fixed cylinder 10; therefore, the second lens group guide pin 41 is driven along the focusing cam slot 32 of the focusing ring 30 by the restriction member 60, and the annular frame 40 (therefore, the second lens group 2) moves back and forth relative to the fixed cylinder 10 by the amount $Z_2$ corresponding to the component in the direction of the optical axis of the focusing cam slot 32, so as to perform the focusing operation. As described above, the amount $Z_2$ in the movement changes according to the zooming region.

Although the driving mechanisms for driving the first lens group 1 and the fourth lens group 4 are not described, these lens groups 1 and 4 are moved along the optical axis only at time of the zooming operation, and the lens groups 1 and 4 are not moved at time of the focusing operation. Namely, it is only the second lens group 2 that is moved along the optical axis at time of the focusing operation.

In the above example of the conventional mechanism shown in FIGS. 1 through 6, the focusing lens group (i.e. the second lens group) 2 moves by the amount $Z_1+Z_2$ relative to the fixed cylinder 10 along the optical axis in the zooming operation, whereas the focusing lens group 2 moves by the amount $Z_2$ relative thereto in the focusing operation. The zoom cam slot 11 which determines the movement amount $Z_1$ along the optical axis is formed on the fixed cylinder 10, whereas the focusing cam slot 32 which determines the movement amount $Z_2$ along the optical axis is formed on the focusing ring 30 which is a member separate from the fixed cylinder 10.

The reason why the zoom cam slot 11 and the focusing cam slot 32 are formed on such separate members is as follows.

Namely, the reason is that in the zooming operation, not only the second lens group (i.e. the focusing lens group) 2 but also the zooming lens groups 1, 3, 4, move along the optical axis, whereas in the focusing operation, only the focusing lens group 2 moves along the optical axis. In other words, it is necessary to prevent the zooming lens groups from moving when the focusing lens group is driven at time of the focusing operation. Therefore, the focusing ring 30 has no slots other than the focusing cam slot 32 which determines the movement amount $Z_2$ of the focusing lens group in the focusing operation.

That is, according to the conventional mechanism, the focusing ring 30 becomes a member which is exclusively used for driving the second lens group 2 at time of the focusing operation, thus increasing the number of assembling parts and increasing the size of the zoom lens as a whole.

There have been proposed a large number of conventional arts about the arrangement and configuration of the cam slot, in addition to the conventional art described above with reference to FIGS. 1 through 6. In each of the conventional arts, an annular member is adopted to drive only the focusing lens group for the focusing operation. On the other hand, in the zoom lens disclosed in each of Japanese Laid-Open Patent Publication Nos. 4-184404 and 4-184405, a cam for driving the focusing lens group is formed on a cam ring on which the cam for driving the zooming lens groups is formed.

But, in the mechanism, an annular member as a connection cylinder is provided separately. Therefore, in respect of an aspect of the number of assembling parts, the mechanism disclosed in the two publications is not so different from the mechanisms using the annular member which is adopted to drive only the focusing lens group.

SUMMARY OF THE INVENTION

Accordingly, it is an object of the present invention to provide an optical device, or a zoom lens, having a plurality of lens groups in which there is no need of the cam ring or focusing ring used only for focusing and in which there is no need of any additional replacement part therefor, so that the zoom lens is more compact, and it is possible to reduce the number in the assembling parts thereof, so as to realize a low cost.

In accomplishing this and other objects of the present invention, in one aspect thereof, there is provided an optical device, or a zoom lens, comprising: a stationary barrel which is stationary relative to an optical device body; a cam ring which is fitted movably relative to the stationary barrel; a zooming lens group which is not movable in a direction of an optical axis at time of focusing and which is moved in the direction of the optical axis only at time of zooming, wherein the zooming lens group has a lens frame with a first guide pin; and a focusing lens group which is moved in the direction of the optical axis at time of both focusing and zooming, wherein the focusing lens group has a lens frame with a second guide pin, wherein the stationary barrel has a first cam slot inside which the first guide pin engages so as to exert a driving force upon the zooming lens group in the direction of the optical axis, and wherein the cam ring. has a first guiding slot inside which the first guide pin engages so as to guide the zooming lens group in the direction of the optical axis, in which the first guiding slot extends generally in the direction of the optical axis, wherein the cam ring has a second cam slot inside which the second guide pin engages so as to exert a driving force upon the focusing lens group in the direction of the optical axis at time of zooming, and wherein the stationary barrel has a second guiding slot inside which the second guide pin engages so as to guide the focusing lens group in the direction of the optical axis, in which the second guiding slot extends generally in the direction of the optical axis, wherein there is further provided a mechanism for guiding the cam ring in the direction of the optical axis and for preventing the cam ring from being rotated at time of focusing, and wherein the cam ring further comprises a focusing cam slot to exert a driving force upon the focusing lens group in the direction of the optical axis at time of focusing.

According to the mechanism, the cam ring is moved straight in the direction of the optical axis without rotation at time of focusing. The first guiding slot for guiding the zooming lens group in the direction of the optical axis is provided on the cam ring generally in the direction of the optical axis in which the cam ring is moved.

Therefore, in spite that the focusing cam slot for giving the driving force to move the cam ring and the focusing lens group in the direction of the optical axis at time of focusing is provided on the same cam ring, the first guide pin for the zooming lens group is not driven at all by the cam ring which moves in the direction of the optical axis at time of focusing.

In other words, even though the cam ring has the focusing cam slot, and the slot for the zooming lens group, it is possible to drive the focusing lens group only in the direction of the optical axis at time of focusing.

Accordingly, with the mechanism, there is no need of an annular member only for focusing in which the focusing cam slot is formed thereon in order to drive the focusing lens group at time of focusing.

Also, with the mechanism, there is no need of mounting other additional members to prevent the zooming lens group from moving in the direction of the optical axis at time of focusing.

By the way, the present invention can apply to any type of optical device or zoom lens which has a lens group having both function of zooming and function of focusing. Namely, irrespective of the total number of the lens groups, it is possible to reduce one annular member by using the above mechanism.

In the mechanism, there can be further provided a focusing mechanism which has a driving pin, wherein the driving pin engages the focusing cam slot of the cam ring so as to drive the cam ring and to move the focusing lens group in the direction of the optical axis at time of focusing.

In case that the above mechanism is the optical device, it may be a camera, for example.

In another aspect of the present invention, there is provided an optical device, or a zoom lens, comprising: a first lens barrel which has a first guide straight slot generally extending along an optical direction and which has a second cam slot; a second lens barrel which fits the first lens barrel movably, wherein the second lens barrel has a first cam slot and has a second guide straight slot generally extending along the optical direction; a focusing lens unit with a cam follower which engages both the first guide straight slot of the first lens barrel and the first cam slot of the second lens barrel, wherein the focusing lens unit is moved along the optical direction by a cooperation of the first guide straight slot thereof and the first cam slot thereof; a zooming lens unit with a cam follower which engages both the second cam slot of the first lens barrel and the second guide straight slot of the second lens barrel, wherein the zooming lens unit is moved along the optical direction by a cooperation of the second cam slot thereof and the second guide straight slot thereof, wherein the second lens barrel further has a focus cam for moving the second lens barrel relative to the first lens barrel along the optical direction.

In the mechanism, for example, there can be provided a construction to prevent a rotation of the second lens barrel relative to the first lens barrel at time of focusing; thus, it is possible that the second lens barrel is moved without rotation in the direction of the optical axis at time of focusing.

With the construction, because the second lens barrel is prevented from rotating at time of focusing, the pin of the zooming lens unit, engaging both the second cam slot of the first lens barrel and the second guide straight slot of the second lens barrel, does not receive a force to move the zooming lens unit in the direction of the optical axis.

Accordingly, with the mechanism, there is no need of an annular member only for focusing in which the focusing cam slot is formed thereon in order to drive the focusing lens group at time of focusing.

In the mechanism, there can be further provided a focusing mechanism which has a drive pin, wherein the drive pin engages the focus cam of the second lens barrel so as to move the second lens barrel relative to the first lens barrel along the optical direction.

In case that the above mechanism is the optical device, it may be a camera, for example.

BRIEF DESCRIPTION OF THE DRAWINGS

This and other objects and features of the present invention will become clear from the following description taken in conjunction with a preferred embodiment thereof with reference to the accompanying drawings, in which:

FIG. 2 is an explanatory view showing an arrangement in which a zoom ring used in the zoom lens of FIG. 1 is developed;

FIG. 3 is an explanatory view showing an arrangement in which a fixed cylinder used in the zoom lens of FIG. 1 is developed;

FIG. 4 is an explanatory view showing an arrangement in which a focusing ring used in the zoom lens of FIG. 1 is developed;

FIG. 5 is an explanatory view showing an arrangement in which an annular lens frame used in the zoom lens of FIG. 1 is developed;

FIG. 6 is an explanatory view showing an arrangement in which an annular lens frame used in the zoom lens of FIG. 1 is developed;

DETAILED DESCRIPTION OF THE PREFERRED EMBODIMENT

Figure 1:
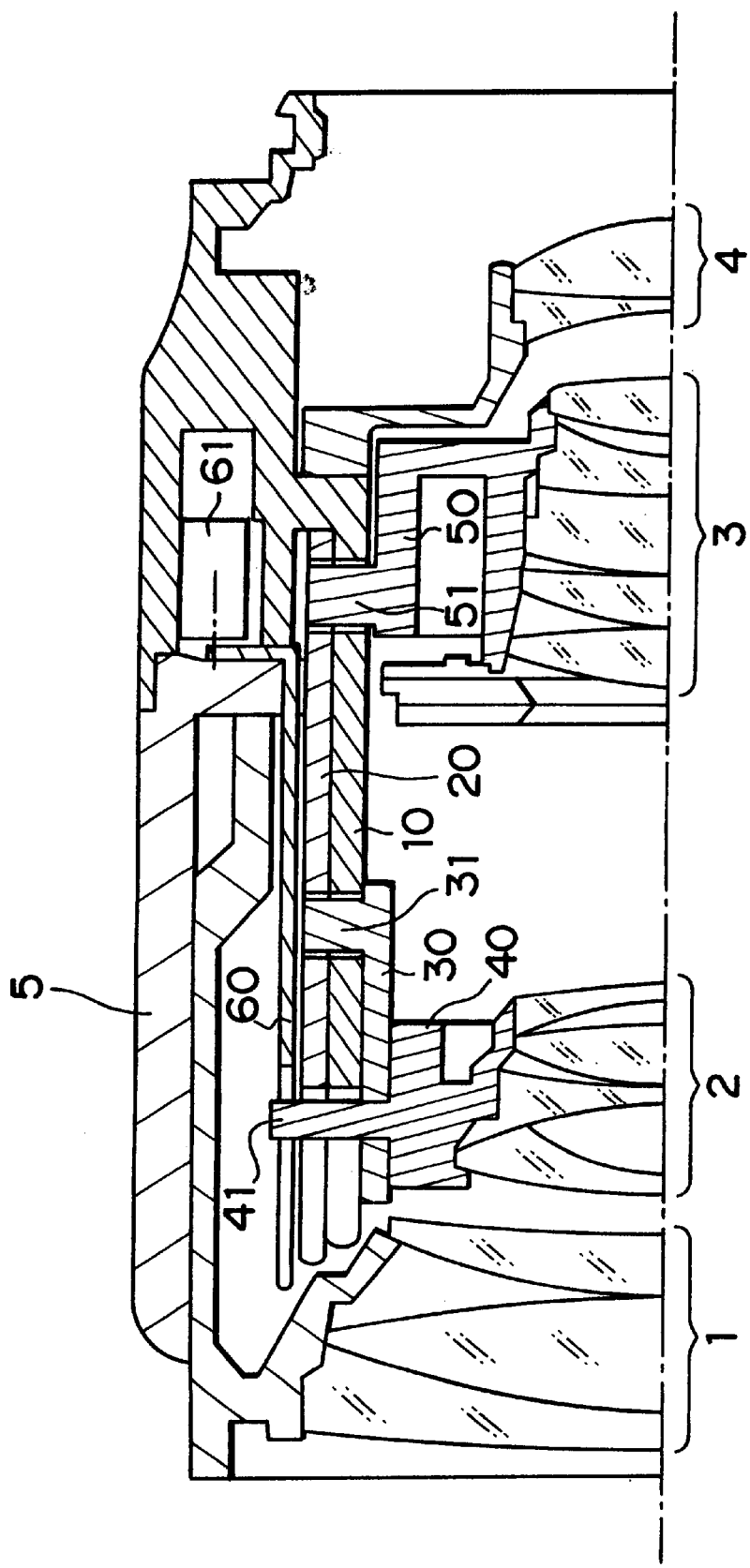
FIG. 1 is a sectional view showing a conventional zoom lens.

Before the description of an embodiment of the present invention proceeds, it is to be noted that like or corresponding parts are designated by like reference numerals throughout the accompanying drawings.

Referring to FIGS. 7 through 12, a description is made below on a zoom lens, according to an embodiment of the present invention, which applies to a camera as one example.

Figure 7:
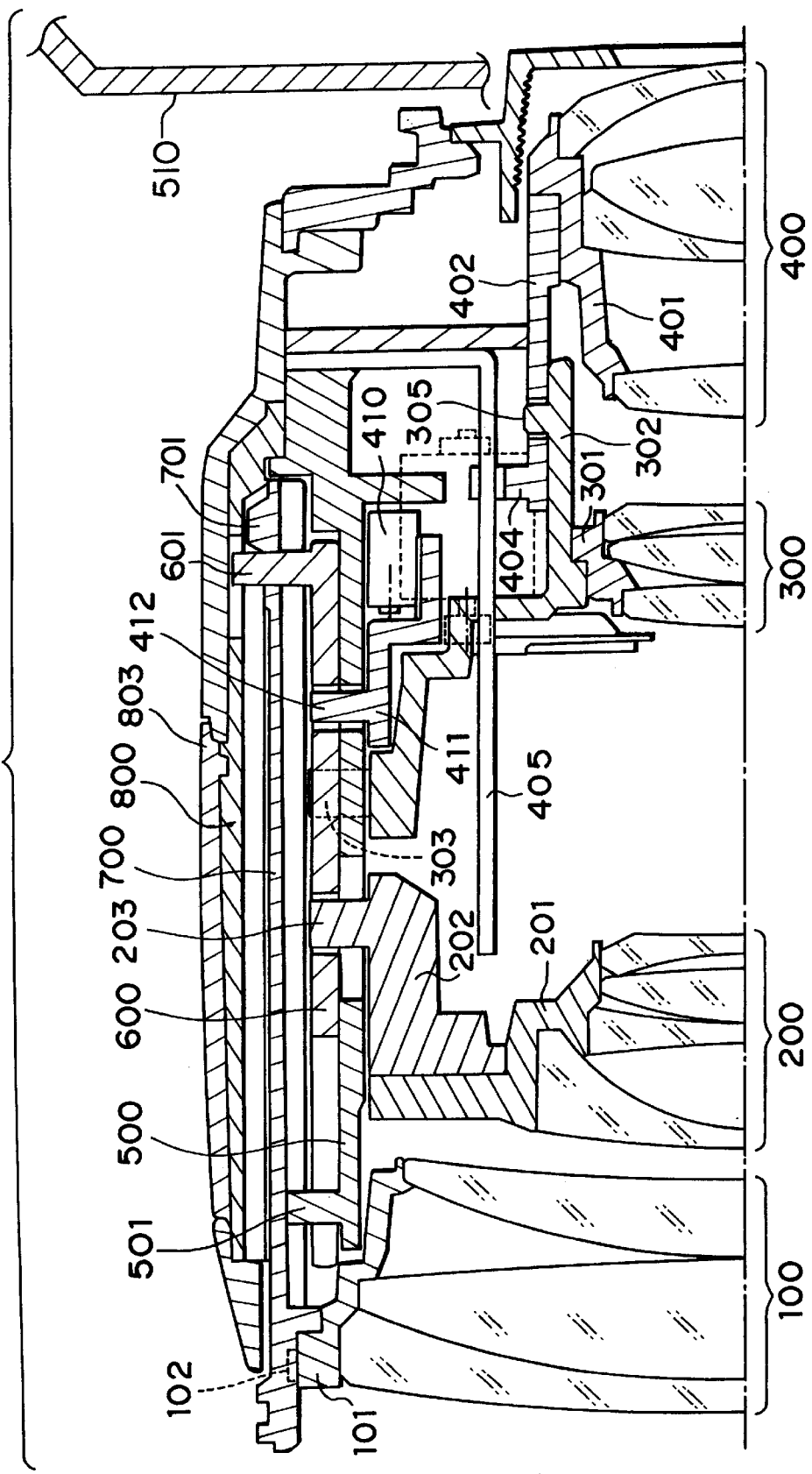
FIG. 7 is a sectional view showing a part of a zoom lens according to an embodiment of the present invention.

FIG. 7 is a sectional view showing a part of the zoom lens, of the embodiment, which is attached to a camera body 510 of a camera. The zoom lens comprises a first lens group 100, a second lens group 200, a third lens group 300, and a fourth lens group 400. The second lens group 200 is a focusing lens group which has both zooming operation and focusing operation; and all the other lens groups 100, 300, and 400 are zooming lens groups each of which has only a zooming operation.

That is, when the zooming operation is performed, all the first, second, third and fourth lens groups 100, 200, 300, and 400 move relative to each other along an optical axis of the zoom lens; meanwhile, when the focusing operation is performed with a magnification unchanged, only the second lens group 200 moves along the optical axis.

Figure 8:
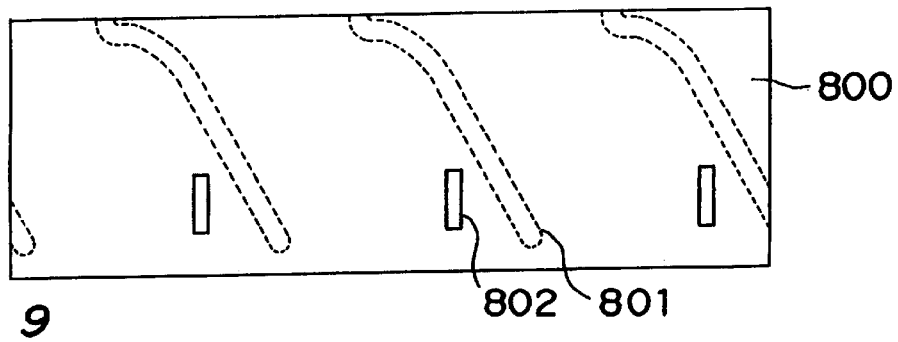
FIG. 8 is an explanatory view showing an arrangement in which a zoom operation cylinder used in the zoom lens of FIG. 7 is developed.
Figure 9:
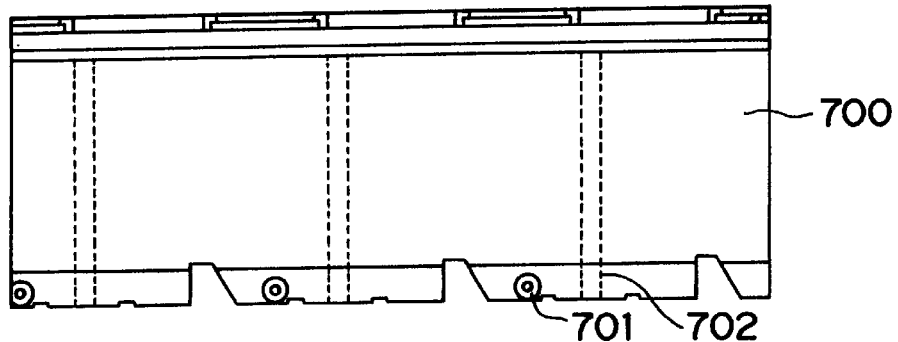
FIG. 9 is an explanatory view showing an arrangement in which a first group holding cylinder used in the zoom lens of FIG. 7 is developed.
Figure 10:
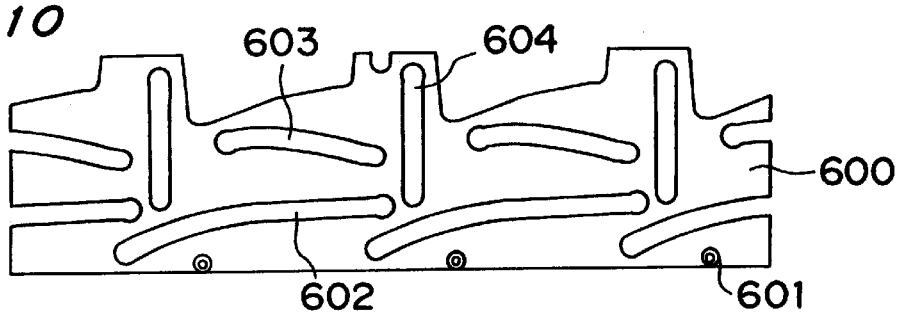
FIG. 10 is an explanatory view showing an arrangement in which a cam ring used in the zoom lens of FIG. 7 is developed.
Figure 11:
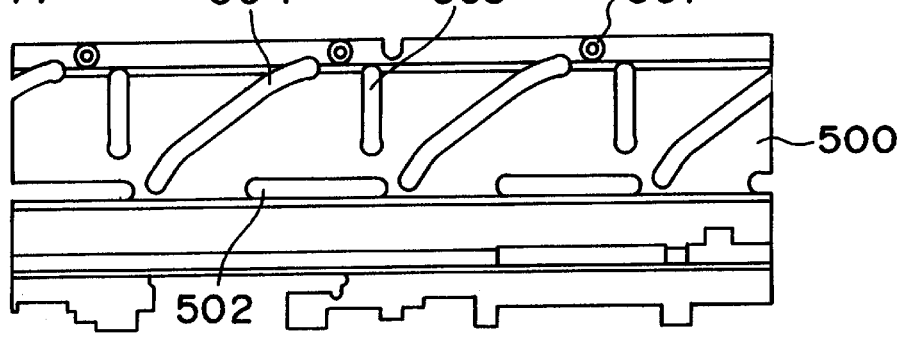
FIG. 11 is an explanatory view showing an arrangement in which a fixed cylinder used in the zoom lens of FIG. 7 is developed.

FIG. 8 is an explanatory view showing an arrangement in which a zoom operation cylinder 800 used in the zoom lens of FIG. 7 is developed; FIG. 9 is an explanatory view showing an arrangement in which a first group holding cylinder 700 used in the zoom lens of FIG. 7 is developed; FIG. 10 is an explanatory view showing an arrangement in which a cam ring 600 used in the zoom lens of FIG. 7 is developed; and FIG. 11 is an explanatory view showing an arrangement in which a fixed cylinder 500 used in the zoom lens of FIG. 7 is developed. These annular-shaped members are inserted and fitted to each other as shown in FIG. 7.

First, referring to FIGS. 7 through 11, a construction of each of the annular-shaped members, namely, a zoom operation cylinder 800, a first group holding cylinder 700, a cam ring 600, and a fixed cylinder 500, is described below.

The zoom operation cylinder 800, shown in FIG. 8, is positioned outermost of the four annular-shaped members 800, 700, 600 and 500. The zoom operation cylinder 800 can be rotated circumferentially by operating an operation portion 803 fixed to a peripheral surface of the zoom operation cylinder 800. A long and narrow first group zooming cam groove 801, having both component in a direction of the optical axis and component in a direction of a circumference thereof, is formed on an inner peripheral surface of the zoom operation cylinder 800. Further, a cam ring linearly guiding slot 802, having only a component in the direction of the optical axis, is formed on the zoom operation cylinder 800.

An interlocking pin 701 fixed to the first group-holding cylinder 700, which is described later, engages the zooming cam groove 801 of the zoom operation cylinder 800. An interlocking pin 601 fixed to the cam ring 600, which is described later, is inserted into and engages the guide slot 802 of the zoom operation cylinder 800.

The first group holding cylinder 700, shown in FIG. 9, fits in the inner peripheral surface of the zoom operation cylinder 800. The interlocking pin 701, which engages the first group zooming cam groove 801 formed on the inner peripheral surface of the zoom operation cylinder 800, is fixed to the first group holding cylinder 700. A guide groove 702 having a component only in the direction of the optical axis of the lens groups, is formed on an inner peripheral surface of the first group holding cylinder 700.

A first group guide pin 501 fixed to the fixed cylinder 500, described later, engages the guide groove 702 of the first group holding cylinder 700.

The cam ring 600, shown in FIG. 10, fits in the inner peripheral surface of the first group holding cylinder 700. The interlocking pin 601 is fixed to the cam ring 600 and is inserted into and engages the guide slot 802 formed on the zoom operation cylinder 800. Further, the cam ring 600 has a focusing cam slot 602, a second group zooming cam slot 603, and a third group linearly guiding slot 604, which are all formed thereon.

Each of the focusing cam slot 602 and the second group zooming cam slot 603, is a long and narrow slot which has a component both in the direction of the optical axis and in a circumferential direction thereof. On the other hand, the third group linearly guiding slot 604 has only a component in the direction of the optical axis.

The fixed cylinder 500, shown in FIG. 11, fits in the inner peripheral surface of the cam ring 600, and is fixed to the camera body 510. That is, the fixed cylinder 500 does not move relative to the camera body 510. The first group guide pin 501 engaging the guide groove 702 formed on the inner peripheral surface of the first group holding cylinder 700 is fixed to the fixed cylinder 500.

Furthermore, the fixed cylinder 500 has a focusing pin guide slot 502, a second group linearly guiding slot 503, and a third group zooming cam slot 504, which are all formed thereon. The third group zooming cam slot 504 is a long and narrow slot which has components in the directions of both the optical axis and the circumference thereof. On the other hand, the second group linearly guiding slot 503 has only a component in the direction of the optical axis; and the focusing pin guide slot 502 has only a component in the direction of the circumference thereof.

Each of the pins, each of the slots, and each of the grooves, mentioned above, is formed on each of the corresponding annular members (i.e. the zoom operation cylinder 800, the first group holding cylinder 700, the cam ring 600, and the fixed cylinder 500) so that there are formed three each in the direction of the circumference thereof.

Next, a construction of a main part of the zoom lens is described below.

By means of a screw 102, as shown in FIG. 7, the first lens group 100 is fixed to a front tip portion of the first group holding cylinder 700 via an annular lens frame 101 for holding the first lens group 100. With the construction, the first lens group 100 moves together with the first group holding cylinder 700.

An annular lens frame 201 for holding the second lens group 200 is connected to a second group moving frame 202 which has a second group guide pin 203. The second lens group guide pin 203 is inserted into and engages both the second group linearly guiding slot 503 of the fixed cylinder 500 and the second group zooming cam slot 603 of the cam ring 600.

An annular lens frame 301 for holding the third lens group 300 is connected to a third group moving frame 302 which has a third group guide pin 303. The third group guide pin 303 is inserted into and engages both the third group zooming cam slot 504 of the fixed cylinder 500 and the third group linearly guiding slot 604 of the cam ring 600.

Figure 12:
FIG. 12 is an explanatory view showing an arrangement in which a moving frame for a fourth lens group used in the zoom lens of FIG. 7 is developed.

An annular lens frame 401 for holding the fourth lens group 400 is connected to a fourth group moving frame 402 which is interlocked with the third group moving frame 302. More specifically, as shown in FIG. 12, a pair of guide slots 403 are formed on the fourth group moving frame 402, and a connection pin 305 fixed to the third group moving frame 302 is inserted into and engages the guide slot 403 of the fourth group moving frame 402.

Next, an operation of each lens group at time of zooming is described below. As described above, in the zooming operation, all of the first through fourth lens groups 100, 200, 300, and 400 move relatively to each other along the optical axis.

(1) Driving of the First Lens Group 100

When the zoom operation cylinder 800 is rotated by a user, a force acts on the first group holding cylinder 700 in both the direction of the optical axis and the direction of the circumference thereof, under a condition in which the interlocking pin 701 of the first group holding cylinder 700 engages the first group zooming cam groove 801 formed on the inner peripheral surface of the zoom operation cylinder 800. However, because the first group guide pin 501 fixed to the fixed cylinder 500 is in engagement with the guide groove 702 formed on inner peripheral surface of the first group holding cylinder 700, the first group guide pin 501 prevents the rotation of the first group holding cylinder 700. That is, when the zoom operation cylinder 800 is rotated, the first group holding cylinder 700 moves back and forth along the optical axis without rotation. Consequently, the first lens group 100 moves back and forth along the optical axis together with the first group holding cylinder 700.

(2) Driving of the Second Lens Group 200

The interlocking pin 601 fixed to the cam ring 600 is inserted into and engages the guide slot 802 of the zoom operation cylinder 800. Therefore, when the zoom operation cylinder 800 is rotated at time of zooming, the cam ring 600 is also rotated together with the zoom operation cylinder 800.

The second group guide pin 203 which is fixed to the second group moving frame 202 is inserted into and engages both the second group linearly guiding slot 503 of the fixed cylinder 500 and the second group zooming cam slot 603 of the cam ring 600. Therefore, when the cam ring 600 is rotated relative to the fixed cylinder 500 as a result of the rotation of the zoom operation cylinder 800 relative to the fixed cylinder 500, the second lens group 200 moves along the optical axis without rotation. Provided that the amount in movement or displacement of the second lens group 200 relative to the cam ring 600 is $Z_1$, the movement amount $Z_1$ is determined by a component in the direction of the optical axis of the zooming cam slot 603 of the cam ring 600.

(3) Driving of the Third Lens Group 300

The third group guide pin 303 fixed to the third group moving frame 302 is inserted into and engages both the third group zooming cam slot 504 of the fixed cylinder 500 and the third group linearly guiding slot 604 of the cam ring 600. Therefore, when the cam ring 600 is rotated relative to the fixed cylinder 500, the third lens group 300 moves along the optical axis while it is rotating.

(4) Driving of the Fourth Lens Group 400

The connection pin 305 fixed to the third group moving frame 302 is inserted into and engages the guide slot 403 formed on the fourth group moving frame 402. Accordingly, when the third lens group 300 moves back and forth along the optical axis while it is rotating, the force of the movement of the third lens group 300 is transmitted to the fourth group moving frame 402.

On the other hand, an engaging claw 404 formed on a peripheral surface of the fourth group moving frame 402 is in engagement with a fourth group linearly guiding key 405 which is fixed to the fixing cylinder 500. Accordingly, the fourth group moving frame 402 moves back and forth without rotation, and the fourth lens group 400 moves together with the fourth group moving frame 402.

Next, an operation of the second lens group at time of focusing is described below. As described above, at time of focusing, only the second lens group (i.e. focusing lens group) 200 moves back and forth along the optical axis.

When an AF (automatic focusing) motor unit 410 is driven based on a photometric value measured by an AF module (not shown) installed inside the camera body 510, a focusing lens driving ring 411 rotates without moving back and forth.

A focusing interlocking pin 412 is fixed to the focusing lens driving ring 411, and is inserted into and engages both the focusing pin guide slot 502 of the fixed cylinder 500 and the focusing cam slot 602 of the cam ring 600. As described above, the focusing cam slot 602 of the cam ring 600 has both the component in the direction of the optical axis and the component in the direction of the circumference thereof. Thus, when the focusing lens driving ring 411 rotates and the focusing interlocking pin 412 fixed thereto moves along the focusing pin guide slot 502 of the fixed cylinder 500, the focusing interlocking pin 412 exerts a force upon the cam ring 600 both in the direction of the optical axis and in the direction of the circumference thereof.

On the other hand, as mentioned above, the interlocking pin 601 of the cam ring 600 is inserted into and engages the cam ring linearly guiding slot 802 of the zoom operation cylinder 800. Thus, upon reception of the driving force from the focusing interlocking pin 412 of the focusing lens driving ring 411, the cam ring 600 is moved back and forth along the optical axis.

By the way, as described above, the cam ring 600 receives a driving force from the focusing interlocking pin 412 in the circumferential direction thereof as well. That is, the interlocking pin 601 of the cam ring 600 exerts a driving force on the zoom operation cylinder 800 in the circumferential direction. The driving force in the circumferential direction, however, is cancelled by a frictional force between the zoom operation cylinder 800 and the fixed cylinder 500. Accordingly, the cam ring 600 does not rotate but moves back and forth due to the rotation of the focusing lens driving ring 411. In other words, in the focusing operation, the guide slot 802 functions as a guide mechanism for linearly guiding the cam ring 600 along the optical axis with a condition in which the rotation of the cam ring 600 is prohibited.

As described above, the second lens group guide pin 203 fixed to the second group moving frame 202 is inserted into and engages both the second group linearly guiding slot 503 of the fixed cylinder 500 and the second group zooming cam slot 603 of the cam ring 600. Thus, when the cam ring 600 moves back and forth, the second lens group 200 also moves back and forth together with the cam ring 600. The second lens group 200 does not rotate when it moves back and forth, because the second group guide pin 203 of the second group moving frame 202 is inserted into and engages the guide slot 503 of the fixed cylinder 500. Provided that the amount in movement or displacement of the cam ring 600 relative to the fixed cylinder 500 is $Z_2$, the movement amount $Z_2$ is determined by a component in the direction of the optical axis of the focusing cam slot 602 of the cam ring 600.

Because the range in movement of the focusing interlocking pin 412 along the focusing cam slot 602 of the cam ring 600 depends upon a zooming region, the movement amount $Z_2$ per a constant amount in movement of the focusing interlocking pin 412 is not constant according to the zooming region.

According to the construction, at time of zooming, the cam ring 600 moves only by the movement amount $Z_2$ relative to the fixed cylinder 500 along the optical axis, and the second lens group 200 moves only by the movement amount $Z_1$ relative to the cam ring 600 along the optical axis. Therefore, in the zooming operation, the second lens group 200 moves by a sum of the movement amount $Z_1$ and the movement amount $Z_2$ relative to the fixed cylinder 500 along the optical axis.

On the other hand, at time of focusing, the second lens group 200 moves only by the movement amount $Z_2$ relative to the fixed cylinder 500 along the optical axis.

It is to be noted that the second group zooming cam slot 603 and the focusing cam slot 602, which respectively determine the movement amount $Z_1$ and $Z_2$ of the second lens group, are formed on the same cam ring 600.

Namely, a pair of slots 602 and 603 for realizing a predetermined amount in movement of the second lens group relative to the fixed cylinder 500 along the optical axis at time of zooming, and a slot 602 for realizing a predetermined amount in movement of the second lens group relative to the cam ring 600 and the fixed cylinder 500 along the optical axis at time of focusing, form on the same member of the cam ring 600.

Therefore, with the construction, it is possible to eliminate the one member, as explained in the prior art, which functions only at time of focusing. Namely, with the construction, it is possible for the two members, namely, the fixed cylinder 500 and the cam ring 600 to achieve the same function as that achieved by the three annular members of the conventional construction, shown in FIGS. 2 through , namely, the fixed cylinder 10, the zoom ring 20, and the focusing ring 30.

In case that the focusing cam slot 602 which determines the predetermined movement amount of the second lens group 200 in the direction of the optical axis at time of the focusing operation forms on the cam ring 600 which moves at time of the zooming operation as well, there is a possibility that not only the second lens group but also the third lens group may be moved in the direction of the optical axis. In order to solve this problem, the following construction is designed and contrived.

That is, as described above, there is provided the mechanism (namely, the cam ring linearly guiding slot 802 of the zoom operation cylinder 800) to guide the cam ring 600 in the direction of the optical axis without rotation at time of the focusing operation, and the third group linearly guiding slot 604 having the component only in the direction of the optical axis is selected, instead of the third group zooming cam slot 504, as a slot for the third lens group 300. In other words, there is provided the third group linearly guiding slot 604 on the cam ring 600 so that the third group linearly guiding slot 604 extends in the direction in which the cam ring 600 moves relative to the fixed cylinder 500.

By the way, because the first lens group 100 and the fourth lens group 400 are, respectively, independent of the cam ring 600, they do not move at time of the focusing operation.

According to the embodiment of the present invention, the zoom lens is applied to the camera just as one example. However, the zoom lens is not limited to this embodiment. For example, the zoom lens can be applied to any other optical device other than the camera.

Also, according to the embodiment of the present invention, the zoom lens is releasably attached to the camera body. Alternatively, the zoom lens may be permanently attached to the camera body.

Although the present invention has been fully described in connection with the preferred embodiment thereof with reference to the accompanying drawings, it is to be noted that other various changes and modifications are apparent to those skilled in the art. Such changes and modifications are to be understood as included within the scope of the present invention as defined by the appended claims unless they depart therefrom.

What is claimed is:

1. An optical device comprising:
    a stationary barrel which is stationary relative to an optical device body;
    a cam ring which is fitted movably relative to the stationary barrel;
    a zooming lens group which is not movable in a direction of an optical axis at time of focusing and which is moved in the direction of the optical axis only at time of zooming, wherein the zooming lens group has a lens frame with a first guide pin; and
    a focusing lens group which is moved in the direction of the optical axis at time of both focusing and zooming, wherein the focusing lens group has a lens frame with a second guide pin,
    wherein the stationary barrel has a first cam slot inside which the first guide pin engages so as to exert a driving force upon the zooming lens group in the direction of the optical axis, and wherein the cam ring has a first guiding slot inside which the first guide pin engages so as to guide the zooming lens group in the direction of the optical axis, in which the first guiding slot extends generally in the direction of the optical axis,
    wherein the cam ring has a second cam slot inside which the second guide pin engages so as to exert a driving force upon the focusing lens group in the direction of the optical axis at time of zooming, and wherein the stationary barrel has a second guiding slot inside which the second guide pin engages so as to guide the focusing lens group in the direction of the optical axis, in which the second guiding slot extends generally in the direction of the optical axis,
    wherein there is further provided a mechanism for guiding the cam ring in the direction of the optical axis and for preventing the cam ring from being rotated at time of focusing, and
    wherein the cam ring further comprises a focusing cam slot to accommodate a driving pin to exert a driving force upon the focusing lens group in the direction of the optical axis at time of focusing.

2. The optical device as claimed in claim 1, which further comprises a focusing mechanism which has said driving pin, wherein the driving pin engages the focusing cam slot of the cam ring so as to drive the cam ring and to move the focusing lens group in the direction of the optical axis at time of focusing.

3. The optical device as claimed in claim 1, wherein the optical device is a camera.

4. An optical device comprising:
    a first lens barrel which has a first guide straight slot generally extending along an optical axis direction and which has a second cam slot;
    a second lens barrel which fits the first lens barrel movably, wherein the second lens barrel has a first cam slot and has a second guide straight slot generally extending along the optical axis direction;
    a focusing lens unit with a cam follower which engages both the first guide straight slot of the first lens barrel and the first cam slot of the second lens barrel, wherein the focusing lens unit is moved along the optical axis direction by a cooperation of the first guide straight slot of the first lens barrel and the first cam slot of the second lens barrel;
    a zooming lens unit with a cam follower which engages both the second cam slot of the first lens barrel and the second guide straight slot of the second lens barrel, wherein the zooming lens unit is moved along the optical axis direction by a cooperation of the second cam slot of the first lens barrel and the second guide straight slot of the second lens barrel,
    wherein the second lens barrel further has a focus cam to accommodate a drive pin for moving the second lens barrel relative to the first lens barrel along the optical axis direction.

5. The optical device as claimed in claim 4, which further comprises a focusing mechanism which has said drive pin, wherein the drive pin engages the focus cam of the second lens barrel so as to move the second lens barrel relative to the first lens barrel along the optical axis direction.

6. The optical device as claimed in claim 4, wherein the optical device is a camera.

7. A zoom lens comprising:
    a stationary barrel which is stationary relative to an optical device body;
    a cam ring which is fitted movably relative to the stationary barrel;

a zooming lens group which is not movable in a direction of an optical axis at time of focusing and which is moved in the direction of the optical axis only at time of zooming, wherein the zooming lens group has a lens frame with a first guide pin; and a focusing lens group which is moved in the direction of the optical axis at time of both focusing and zooming, wherein the focusing lens group has a lens frame with a second guide pin, wherein the stationary barrel has a first cam slot inside which the first guide pin engages so as to exert a driving force upon the zooming lens group in the direction of the optical axis, and wherein the cam ring has a first guiding slot inside which the first guide pin engages so as to guide the zooming lens group in the direction of the optical axis, in which the first guiding slot extends generally in the direction of the optical axis, wherein the cam ring has a second cam slot inside which the second guide pin engages so as to exert a driving force upon the focusing lens group in the direction of the optical axis at time of zooming, and wherein the stationary barrel has a second guiding slot inside which the second guide pin engages so as to guide the focusing lens group in the direction of the optical axis, in which the second guiding slot extends generally in the direction of the optical axis, wherein there is further provided a mechanism for guiding the cam ring in the direction of the optical axis and for preventing the cam ring from being rotated at time of focusing, and wherein the cam ring further comprises a focusing cam slot to accommodate a driving pin to exert a driving force upon the focusing lens group in the direction of the optical axis at time of focusing.

8. The zoom lens as claimed in claim 7, which further comprises a focusing mechanism which has said driving pin, wherein the driving pin engages the focusing cam slot of the cam ring to exert the driving force upon the focusing lens group in the direction of the optical axis at time of focusing.

9. A zoom lens comprising:

a first lens barrel which has a first guide straight slot generally extending along an optical axis direction and which has a second cam slot;

a second lens barrel which fits the first lens barrel movably, wherein the second lens barrel has a first cam slot and has a second guide straight slot generally extending along the optical axis direction;

a focusing lens unit with a cam follower which engages both the first guide straight slot of the first lens barrel and the first cam slot of the second lens barrel, wherein the focusing lens unit is moved along the optical axis direction by a cooperation of the first guide straight slot of the first lens barrel and the first cam slot of the second lens barrel;

a zooming lens unit with a cam follower which engages both the second cam slot of the first lens barrel and the second guide straight slot of the second lens barrel, wherein the zooming lens unit is moved along the optical axis direction by a cooperation of the second cam slot of the first lens barrel and the second guide straight slot of the second lens barrel, wherein the second lens barrel further has a focus cam to accommodate a drive pin for moving the second lens barrel relative to the first lens barrel along the optical axis direction.

10. The zoom lens as claimed in claim 9, which further comprises a focusing mechanism which has said drive pin, wherein the drive pin engages the focus cam of the second lens barrel so as to move the second lens barrel relative to the first lens barrel along the optical axis direction.

* * * * *